United States Patent Office 3,499,866

Patented Mar. 10, 1970

1

3,499,866

EPOXY STABILIZER IN POLY(VINYL CHLORIDE) RESINS

Peter A. Schwab, Ponca City, Okla., assignor, by mesne assignments, to Teknor Apex Company, a corporation of Delaware No Drawing. Filed May 10, 1966, Ser. No. 548,860

Int. Cl. C08f 45/58

U.S. Cl. 260—45.8 9 Claims

ABSTRACT OF THE DISCLOSURE

It is disclosed that polyvinylchloride resins in a standard stabilized formulation containing a plasticizer, a primary stabilizer, and a secondary glycidyl ether stabilizer are improved when the glycidyl ether compound is characterized in containing at least one structural unit of the formula:

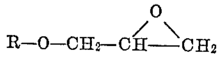

wherein R is alkyl, aryl, alkaryl, aralkyl or a radical of the formula

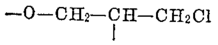

This invention relates to poly(vinyl chloride) resin compositions stabilized with glycidyl ethers, and to methods of preparing such compositions. In another aspect, the invention relates to a novel method for preparing glycidyl ether compositions which are of particular utility in the thermal stabilization of vinyl chloride polymer and copolymer resins.

It is known that certain epoxy compounds impart a measure of thermal stability to poly(vinyl chloride) resins. These compounds are usually epoxidized natural oils, particularly epoxidized esters of unsaturated acids. These compounds, however, do not impart an optimum degree of thermal stability to poly(vinyl chloride) resins in which they are used, and in some instances are compatible with the resins only in small quantities.

Glycidyl ethers and mixtures of these compounds with related materials have heretofore been widely used in the detergent industry, and have been found to have some utility in poly(vinyl chloride) plastisol formulations for controlling the initial viscosity of the plastisol. The relatively high molecular weight, substantially straight chain glycidyl ether compositions useful in poly(vinyl chloride) plastisols, however, cannot be effectively used in poly (vinyl chloride) extrusions and solid sheets of these resins as thermal stabilizers since the formulations turn amber on the mill rolls, and the color intensifies and darkens where the poly(vinyl chloride) sheets are press polished. These particular glycidyl ether compositions also lack the desired degree of compatibility with the poly(vinyl chloride) resins.

In accordance with this invention, new poly(vinyl chloride) resin compositions which are stabilized with glycidyl ethers are provided, such glycidyl ethers being characterized in having good compatibility with the poly(vinyl chloride) resinous material, a sufficiently high epoxy content to impart good thermal stability to the resin, and a molecular structure which resists volatilization on heating or aging. These glycidyl ether-stabilized resinous compositions comprise vinyl chloride polymers or copolymers and a glycidyl ether compound characterized in containing at least one structural unit of the formula

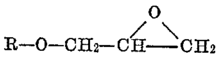

2 where R is selected from the group consisting of alkyl, aryl, alkaryl and aralkyl radicals and a radical of the formula

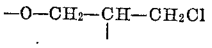

Preferably, the glycidyl ether contains a plurality of the structural groups

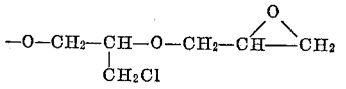

and assumes the form

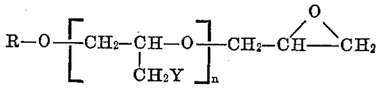

where R is a polyvalent hydrocarbon radical, and $n$ is an integer of from 2 to 10.

In a different aspect of the invention, a novel procedure is proposed for preparing certain of the glycidyl ethers having particular utility as stabilizing agents when incorporated in vinyl chloride resins. In this process, an epichlorohydrin is reacted with a normal or straight chain primary alkanol containing from 8 to 18 carbon atoms, or with a mixture of such alkanols. The reaction is carried out in the presence of antimony pentachloride as a catalyst and yields, as products of this condensation reaction, glycidyl ether and glycidyl chloropolyether adducts. One of the marked advantages of the described process over those which have been previously employed in the preparation of glycidyl ethers using normal, primary alcohol as a starting material is in the higher extent of conversion of the alcohol, so that the resulting reaction mixture contains less unreacted alcohol and a larger percentage of glycidyl ether compounds. Generally, the alcohol present in the final reaction mixture will be less than 10 weight percent of the total mixture. In addition to this desirable result, which is due to the greater selectivity of the antimony pentachloride catalyst, this catalyst material is substantially less expensive than most other acid type catalysts which have been conventionally used for the production of glycidyl ethers by generally similar reactions.

From the foregoing description of the invention, it will have become apparent that it is an important object of the invention to provide new poly(vinyl chloride) resins of improved thermal stability.

Another object of the invention is to provide a new process for preparing thermally stabilized poly(vinyl chloride) resins.

An additional object of the invention is to provide a method for preparing glycidyl ether compositions which have been found to be highly useful in the thermal stabilization of poly(vinyl chloride) resins.

A more specific object of the invention is to provide an improved method for preparing certain types of glycidyl ether compositions, by which method the cost of production of such materials is reduced, and the product yield from the conventionally employed starting materials is increased.

In addition to the foregoing described objects and advantages, additional objects, aspects and advantages will become apparent upon study of the following detailed description of the invention and the appended claims.

The poly(vinyl chloride) resin compositions of the invention are solid plasticized polymers or copolymers of vinyl chloride (as contrasted with pastisol dispersions) which, in addition to the vinyl chloride, include a stabilizilizing compound which charateristically includes one or more of the glycidyl ether groups

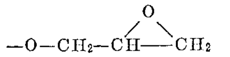

In general, the larger the number of these groups that are present in the glycidyl ether molecules, the more effective is the thermal stabilization obtained.

The glycidyl ether compounds most useful as thermal stabilizing materials in poly(vinyl chloride) resins can be broadly characterized as selected from the group of compounds having one of the following structural formulae, in all of which Y is a halogen atom:

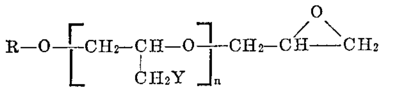

(1)

where R is selected from the group consisting of alkyl, aryl, alkaryl and aralkyl radicals, and *n* is an integer of from 0 to 5

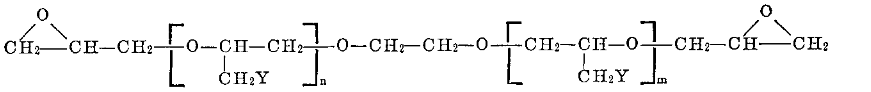

(2)

where *m* and *n* are each integers of from 0 to 4, inclusive;

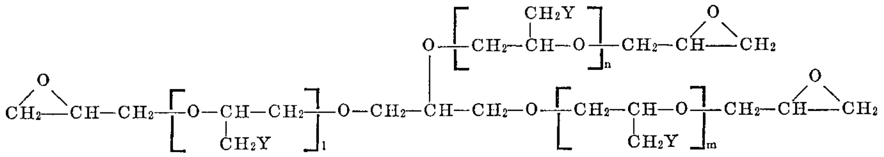

(3)

where *m, n* and *l* are integers of from 0 to 3, inclusive; and

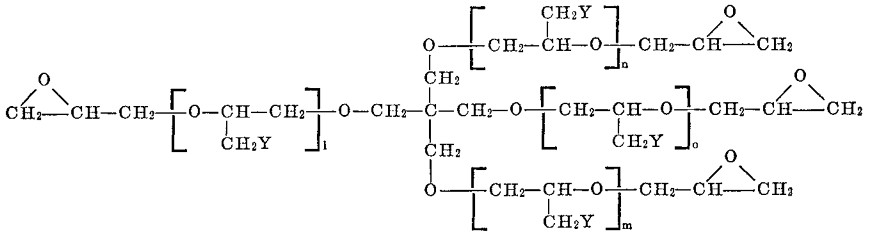

(4)

where *l, m, n* and *o* are integers of from 0 to 2, inclusive. Compounds having one of the Formulae 2, 3 or 4 are derived from the reaction of epihalohydrin with certain low molecular weight polyhydroxyl alkanols as hereinafter explained.

Further than this structural definition of the glycidyl ethers, these glycidyl ether compounds employed as thermal stabilizers have a molecular weight exceeding about 180, and have no more than 18 methylene groups serially connected in a straight, unsubstitued hydrocarbon chain. It is to be understood that a number of methylene groups exceeding 18 may be present in the glycidyl ether molecules provided they occur in branched chain configurations, and not in an elongated, unsubstituted straight chain. These properties of molecular weight and hydrocarbon chain configuration are important factors in determining the volatility of the thermal stabilizer compounds when incorporated in the poly(vinyl chloride) resin, and the compatibility of the additive with the resin, respectively. Thus, glycidyl ethers whose molecular weight is less than about 180 provide an undesirably high weight loss from the resin composition due to volatilization. Further, the compatibility of the ethers in the poly (vinyl chloride) formulations decreases as the length of any included straight, unsubstituted hydrocarbon chain increases.

The preferred glycidyl ethers for use as thermal stabilizers in poly(vinyl chloride) resins are those which are derived from relatively low molecular weight polyhydric alcohols, and those which are derived from straight chain primary alkanols containing from 8 to 18 carbon atoms—the former because of their superior stabilizing properties, and the latter because of the ease and economy with which they may be manufactured. More will be said about these two generic types of glycidyl ethers hereinafter.

In the case of all of the described glycidyl ethers, they are prepared by reacting by a condensation reaction, an organic hydroxy compound with an epihalohydrin in the presence of a suitable catalytic material. The described condensation reaction can be carried out under either acidic or basic conditions using such basic catalysts as sodium methoxide and sodium hydroxide, or acid catalysts of the Friedel-Crafts type, including perchloric acid, hydrogen fluoride, stannic chloride, boron trifluoride and boron trifluoride etherate. In general, the condensation reaction which occurs in the first step of the glycidyl ether preparation is well-known, as are the catalysts which can be employed and the conditions of temperature and pressure utilized. The acidic catalysts are preferably used, and when they are employed a halohydrin compound containing a secondary hydroxyl group is initially produced. This compound can then react further with the epihalohydrin reactant to give a halo-halohydrin. This competitive multi-condensation can continue until the epichlorohydrin reactant is exhausted. As a second step of the process conventionally used in preparing the glycidyl ethers, the mixture of halohydrin and multihalohydrin intermediate materials is subjected to dehydrohalogenation using an aqueous basic solution to form the epoxide groups in general, and the glycidyl ethers specifically.

The type of glycidyl ethers which are produced, and the compositions of the final reaction mixture, depend, of course, upon the type of hydroxy compound used as a starting material, and upon the mole ratio of the epihalohydrin to the hydroxy compound. In accordance with the teaching of this invention, the organic hydroxy compound employed as a starting material should be selected so that the molecular weight of the product ethers is above about 180, and excessively long straight chain ethers are not formed. Further, since it is preferred to incorporate in the glycidyl ether products as much oxirane oxygen (epoxy groups) as possible, it is preferable to use as the starting hydroxy compound, a polyhydroxy compound, such as ethylene glycol (a diol), glycerol (a triol) and pentaerythritol (a tetraol). These polyhydric alcohols condense with an epihalohydrin compound to form the above described halohydrin intermediates which are then dehydrohalogenated with a basic solution to form glycidyl ethers in which the glycidyl ether groups present in each molecule correspond in number to the number of hydroxy groups present in the parent polyhydroxy starting material. Moreover, the resulting glycidyl ethers are of relatively high molecular weight, and are of predominantly branched chain configuration, with the extent of branching, as well as the molecular weight, increasing with the number of hydroxy groups present in the starting material.

The importance of the structure of the starting hydroxy compounds as described above can be further illustrated. The reaction of a normal, primary alkanol with epihalohydrin in the presence of a suitable catalyst yields a glycidyl ether having the structural Formula 1 hereinbefore set out. Where ethylene glycol is the alcohol used, the glycidyl ethers produced have the structure set out in Formula 2. Where glycerol is the alcohol used, the glycidyl ethers produced have the structure set out in Formula 3 and the use of pentaerythritol yields glycidyl ethers having a structure identified by Formula 4.

Example of organic hydroxy compounds which can be used as a starting material in the production of suitable glycidyl ethers are ethylene glycol, n-octanol, 3-methyl-2-nonanol, n-decanol, propylene glycol, glycerol, pentaerythritol, polyallyl alcohol, phenol, dimethylol xylenes, n-dodecanol, n-tetradecanol, 2,4-dinonylphenol, tert-octylphenol, 2-tridecylphenol, n-octadecanol, 4-methyl 3-ethyl-pentadecanol, 2,4-dimethylphenol. Many other hydroxy compounds not included in this list of examples are also suitable.

The epihalohydrin employed has the formula

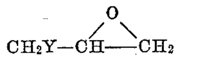

where Y is a halogen atom, and is preferably selected from the group consisting of chlorine, bromine and iodine, and is most preferably chlorine.

The mole ratio of the reactants employed is also an important consideration in carrying out the condensation reaction in that it affects the structure of products yielded and the extent to which the alcohol is converted to product. Thus, in general, the higher the mole ratio of epihalohydrin to hydroxy compound employed, the higher are the molecular weights of the epihalohydrin adducts formed, and the greater the number of $$-O-CH_2-\underset{|}{CH}-CH_2Y$$

(where Y is a halogen atom) groups included in the final ether products in a predominantly straight chain configuration—frequently an undesirable result in terms of compatibility with poly(vinyl chloride) as hereinbefore described, particularly when normal primary alkanols are used as starting materials. On the other hand, a high mole ratio of epihalohydrin to hydroxy compound results in the conversion of a greater portion of the hydroxy compound to glycidyl ethers. This is a desirable result where it is undertaken to incorporate the entire unresolved organic phase of the reaction mixture into poly(vinyl chloride) resin composition, since the unreacted hydroxy compound usually detrimentally affects thermal stability, and often results in considerable weight loss over extended periods of time due to its volatilization. Thus, an optimum range of reactant mole ratios will usually be characteristic of each type of organic hydroxy starting material used in order to derive from the reaction mixture, the product glycidyl ethers which are best suited, without further treatment or separation, for inclusion in a poly(vinyl chloride) resin composition as a thermal stabilizing material.

Based upon the foregoing considerations, some general guidelines can be laid down for the manner of carrying out the reaction used to prepare the glycidyl ethers which are incorporated in poly(vinyl chloride) resins to impart thermal stability thereto in accordance with the invention. First, the organic hydroxy compounds used as reactants must be capable of yielding glycidyl ethers characterized by the limitations of molecular weight and carbon chain configuration hereinbefore described. Within this group, the relatively low molecular weight (2 to 5 carbon atoms) polyhydroxy alkanols are preferred because they yield branched glycidyl ethers containing multiple oxirane linkages. A second class of alcohols also constitute preferred starting materials for reasons of ease of preparation of the ethers, economy of manufacture, and low alcohol content in the product as will be hereinafter explained. These alcohols are normal primary alkanols containing from 8 to 16 carbon atoms.

Second, the mole ratio of reactants utilized to prepare the glycidyl ether components of the stabilized poly (vinyl chloride) compositions are broadly those which have been utilized previously in the preparation of glycidyl ethers for other purposes, i.e., from about 0.2 to about 10, epihalohydrin to hydroxyl compound. The preferred range employed, however, is from about 0.5 to about 3, and, as explained above, the mole ratio selected will vary within this broad range with the type of hydroxy compound employed in order to obtain an optimum balance of unreacted hydroxy compound with reaction products, and to concurrently obtain maximum compatibility of the glycidyl ether reaction products with the poly(vinyl chloride) formulations. Usually, a mole ratio of epihalohydrin to hydroxy compound exceeding 1 will be required where it is intended to incorporate the entire organic phase of the reaction mixture in the poly (vinyl chloride) composition.

The temperature at which the reaction is carried out is limited in all cases by the boiling point of the epihalohydrin which ranges from 117° C. in the case of epichlorohydrin to about 180° C. in the case of epiiodohydrin. The lower limit of temperature which can practicably be employed is about 25° C. In the case of any of the epihalohydrins, however, a temperature range of from about 75° C. to about 120° C. is preferred, and the most desirable temperature range is from about 85° C. to about 100° C. The condensation reaction of the epihalohydrin with the hydroxy compound can suitably be carried out at atmospheric pressure, but higher pressures can be employed if desired.

Any of the catalysts, acid or basic, which have been known to the prior art as useful in the described condensation reaction are suitable for use in the preparation of the defined glycidyl ethers used in this invention. The acid catalysts are, however, preferred, and are employed in an amount of from about 0.1 to about 5 weight percent, based on the weight of the hydroxy compound utilized. An amount of catalyst of between 0.5 and 2.75 weight percent is generally preferred, and the most satisfactory results have been realized when using between 1 and 2.5 weight percent of the catalyst.

It is well to point out, while referring to the catalysts useful in the preparation of the glycidyl ethers, that I have discovered antimony pentachloride to possess a striking advantage over other catalyst materials, insofar as the production of glycidyl ether compositions having special utility as thermal stabilizing materials is concerned. This catalyst is more selective, apparently, than catalysts which have generally been used to promote the described condensation reaction with the result that a higher percentage of the organic hydroxy compound is converted to glycidyl ether compounds, and conversely, less unreacted hydroxy compound remains in the final reaction mixture. This mixture can therefore be used, after separation from the inorganic phase produced in the final dehydrohalogenation reaction, without further refinement or purification, as an effective thermal stabilizing composition when incorporated in poly(vinyl chloride) resins. Where relatively low boiling alcohols are employed as reactants, the low alcohol content of the product additive results in the poly(vinyl chloride) composition undergoing less weight loss over extended periods of time, and the thermal stabilizing effect of the added composition is also enhanced by its relatively low alcohol content.

A preferred process for preparing the glycidyl ether thermal stabilizing compositions comprises initially reacting normal or straight chain primary alkanols containing from 8 to 18 carbon atoms, and preferably from 10 to 14 carbon atoms, with epichlorohydrin, using antimony pentachloride as a catalyst. The preference for this procedure is based on the availability and economy of the described normal, primary alkanols, the previously described selectivity and economic advantage which characterizes this particular catalyst, and the overall effectiveness as a poly(vinyl chloride) stabilizing composition of the total organic phase yielded in the reaction mixture.

The straight chain primary alkanols employed can be conveniently derived from a so-called "growth reaction" in which ethylene is added to a trialkyl aluminum compound under suitable conditions of temperature and pressure so as to extend the length of the alkyl substituents of the aluminum atom. The alkyl substituents formed by such growth reaction are straight chain or normal in character and have a length (in terms of carbon number) which is determined in the total product according to a Poisson distribution. The trialkyl aluminum growth product is then subjected to oxidation to form the corresponding aluminum trialkoxide, and finally, is hydrolyized to yield a mixture of normal primary alkanols. The chain length of the alcohols in this mixture of normal primary alkanols is determined by how long the growth reaction is permitted to proceed (i.e., how many moles of ethylene are added to the original trialkyl aluminum molecule). In all cases, however, the number of carbon atoms present in the several types of alcohols thus produced are in accordance with a Poisson distribution. Since the reaction parameters and conditions employed in this growth reaction are well understood in the art and can be thoroughly understood by referring to U.S. Patent 3,053,905, no further explanation or discussion of the reaction is believed necessary. As has been indicated, the normal primary alkanols used in the preferred process of the present invention for producing glycidyl ethers useful as thermal stabilizing materials contain from 8 to 18 carbon atoms. Normal primary alcohols containing fewer carbon atoms produce ether products having too high a volatility for useful employment in poly(vinyl chloride) compositions, and those having more than 18 carbon atoms in the straight chain or normal configuration produce glycidyl ethers lacking the necessary compatibility with the poly(vinyl chloride) resins. These considerations constitute another reason for preferring the mixture of alkanols produced by the trialkyl aluminum-ethylene growth reaction, since these mixtures can be directly yielded with relatively small amounts of $C_8$ or $C_{16}$ alcohols in admixture with relatively large amounts of alcohols containing an intermediate number of carbon atoms.

The reatcion of epichlorohydrin with the normal primary alkanol, or mixture of such alkanols, in the presence of antimony pentachloride catalyst, followed by treatment of the reaction product with an aqueous basic solution to effect dehydrohalogenation and close the three membered epoxy ring can be represented as follows

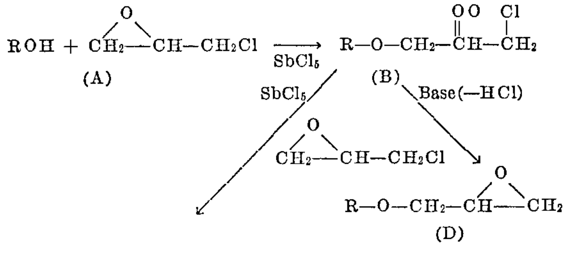

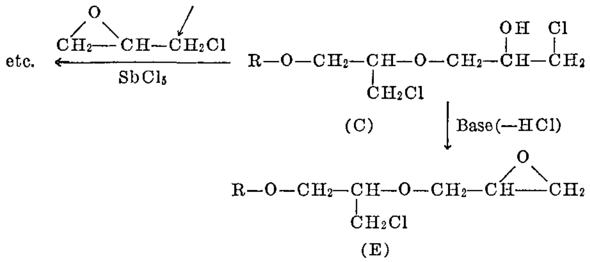

Thus, the reaction of the epichlorohydrin with the normal primary alcohol (A), using the antimony pentachloride catalyst, gives a chlorohydrin (B) containing a secondary hydroxyl group which can react further with epichlorohydrin to give a chloro-chlorohydrin (C). This competitive multi-condensation can continue until the epichlorohydrin is exhausted. Not all of the original alcohol has been consumed at the end of the reaction and, after treatment with base to close the three membered epoxide ring, a mixture consisting of unreacted starting alcohol (A), glycidyl ether (D), an glycidyl diether (E) is obtained. Also present may be small amounts of the corresponding chlorohydrins (B, C) which, during treatment with base did not react to form the glycidyl ethers. Increasing the mole ratio of epichlorohydrin to alcohol yields increasingly higher molecular weight epichlorohydrin adducts by repetition of the group

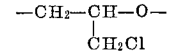

It also has the effect of increasing the amount of alcohol converted to glycidyl ethers, and decreasing the compatibility of the product mixture as a result of increase in the carbon chain length. An excellent glycidyl ether product for purposes of thermal stabilization results when a mole ratio of from about 1 to about 3 is used (epichlorohydrin to alcohol), though higher and lower mole ratios within the broad range hereinbefore disclosed can also be less successfully utilized.

The antimony pentachloride catalyst is used in an amount of from about 1 weight percent to about 3 weight percent, based on the weight of the alcohol, and preferably from about 1.25 to about 2.75 weight percent. I have found that by using this catalyst and a favorable mole ratio of epichlorohydrin to alcohol, the amount of unreacted alcohol can be reduced to as low as about 5 weight percent of the total product.

A final consideration in the practice of the invention is the incorporation of the glycidyl ethers, made as hereinbefore described and possessing the defined properties requisite for this use, in the poly(vinyl chloride) formulations in which they are to be used as stabilizers. This is accomplished in substantially the same manner as the previously used epoxidized natural oils are incorporated in such resin compositions, with the amount of glycidyl ether incorporated in the blend being from about 1 to 10 parts of the ether composition per 100 parts of resin. Preferably, from about 2 to about 5 parts of the stabilizer composition per 100 parts of the resin are utilized.

The following specific examples will serve to illustrate various aspects of the invention, but are not intended to be limiting, since other reactants, reactant conditions, and proportions of materials not specifically mentioned in the following examples can be utilized within the broader scope defined by the basic principles of the invention.

EXAMPLE 1

This example demonstrates the preparation of glycidyl ethers suitable for use as thermal stabilizers in poly(vinyl chloride) resins by one of the preferred processes of the invention in which antimony pentachloride is used as the catalyst, and the alcohol reactant employed is a straight chain, primary alkanol mixture derived from a trialkyl aluminum-ethylene growth reaction.

Into a five-liter, three-neck round bottom flask equipped with a mechanical stirrer, thermometer and dropping funnel were charged 1600 grams (9.3 moles) of a mixture of normal, primary alkanols comprising about 61.9 weight percent n-dodecanol, 20.3 weight percent n-decanol, 17.2 weight percent n-octanol and about 0.3 weight percent each of n-hexanol and n-tetradecanol. This mixture of alkanols was prepared by selective fractionation of growth product produced in the growth reaction as hereinbefore described. Also added to the five-liter flask at the outset of the reaction were 32 grams (2 weight percent, based on the weight of the alcohol) of antimony pentachloride. While stirring, this solution was heated to 90° C., and then a heating mantle employed for raising the temperature was removed. 925 grams (10 moles) of epichlorohydrin were added dropwise at this time in such a way as to maintain the temperature of the reaction mixture at 90° C. After complete addition of the epichlorohydrin, the reaction mixture was heated for an additional hour at 90° C. Then a solution of 440 grams (11 moles) of sodium hydroxide and 660 grams of water was added, maintaining the temperature at 90° C. while stirring for five hours. After cooling the reaction mixture to room temperature, enough water was added to dissolve the white insoluble salts. The organic layer was then separated, washed again with water, and dried over anhydrous magnesium sulfate. Filtration of the solution gave a clear, light yellow liquid with a slight alcoholic odor. Analysis of the isolated and purified organic layer by gas chromatography analysis showed it to consist of the following:

| | Percent | | |
|---|---|---|---|
| | Alcohol | Glycidyl Ether | Glycidyl Chlorodiether |
| $C_8$ | 1.4 | 14.8 | 1.7 |
| $C_{10}$ | 1.7 | 16.6 | 1.9 |
| $C_{12}$ | 5.5 | 50.5 | 5.9 |
| Total | 8.6 | 81.9 | 9.5 |

EXAMPLE 2

Glycidyl ether mixtures were made by the procedure described in Example 1, except that various normal, primary alkanols or mixtures thereof were used, and different reactant mole ratios were employed in some of the reactions. Glycidyl ether mixtures were also prepared using frequently employed boron trifluoride etherate as a catalyst for purposes of comparison. The glycidyl ethers so prepared were blended in a typical extrusion formulation for poly(vinyl chloride) containing 100 parts by weight of vinyl chloride, 50 parts by weight of a commercially available phthalate ester plasticizer, 2 parts of a commercially available barium-cadmium primary stabilizer, and 4 parts of the glycidyl ether composition. After milling and press polishing, test strips of the formulated resins were subjected to a seven-day heat stability test at 100° C. For comparison purposes, identical formulations containing a currently widely used octyl epoxy stearate stabilizer, and also containing no epoxy type stabilizer at all were subjected to the same heat stability test. The results of these tests are set forth in Table I.

EXAMPLE 3

A mixture of 99.4 weight percent 1-dodecanol with 0.3 weight percent 1-decanol and 0.3 weight percent 1-tetradecanol was reacted with excess epichlorohydrin in two different reactions, each of which employed 3 weight percent antimony pentachloride (based on the weight of the alkanols). In one run, the mole ratio of epichlorohydrin to the alcohol mixture was 2:1 and in the other, it was 3:1. The reaction conditions described in Example 1 were otherwise employed in both runs.

In the reaction using a 2:1 epichlorohydrin to alcohol mole ratio, a glycidyl ether mixture was yielded containing 1 percent unreacted alcohol and 35 percent, 40 percent, 20 percent, and 4 percent mono-, di-, tri-, and tetra-epichlorohydrin adducts (all percents are percent by weight). Reaction with three moles of epichlorohydrin per mole of the alcohol gave a viscous yellow liquid whose total composition could not be determined due to the very high mlecular weight epichlorohydrin adducts in the mixture. Poly(vinyl chloride) resin formulations containing each of these glycidyl ether mixtures were subjected to the seven-day heat stability test at 100° C. Their weight percent loss (4.27 and 4.39 percent, respectively) was substantially the same as the weight loss exhibited by the most widely used commercially available epoxy type stabilizing material (octyl epoxy stearate) in an identical formulation. The resin containing the higher molecular weight glycidyl ethers derived from the reaction employing a 3:1 mole ratio did not discolor in the seven-day test, even though the resin containing the standard or conventional commercially available epoxy stabilizer compound became dark yellow.

EXAMPLE 4

Three poly-functional glycidyl ether mixtures each containing in predominance one of the poly-functional ethers of the type identified by Formulae 2, 3 and 4 hereinbefore set forth were prepared by condensing epichlorohydrin with ethylene glycol, glycerol and pentaerythritol, respectively. In each case a 3:1 mole ratio of epichlorohydrin to polyhydric alcohol was used. Each glycidyl ether composition yielded was a viscous yellow product, and when incorporated in a standard poly(vinyl chloride) formulation, imparted excellent thermal stability thereto. The formulations exhibited relatively little weight loss over extended periods of time as a result of volatilization of these glycidyl ether additives.

From the foregoing examples and description of the invention, it will have become apparent that new, thermally stabilized poly(vinyl chloride) compositions have been prepared which exhibit superior thermal stability, and comparable or improved weight loss properties as compared to thermally stabilized poly(vinyl chloride) compositions prepared using the types of epoxidized natural oils and the like heretofore utilized as thermal stabilizing materials. The invention also proposes a new, economical procedure for preparing certain of the glycidyl ethers which find special utility as thermal stabilizers in poly(vinyl chloride) compositions.

Although certain specific examples of the invention

TABLE I

| Alcohol precursor of glycidyl ether mixture | Catalyst: Type | Catalyst: Wt. percent | Reactant,[1] mole ratio | GLPC analysis: Percent alcohol | GLPC analysis: Percent glycidyl ether | GLPC analysis: Percent glycidyl chlorodiether | Color after 7 days at 100° C. |
|---|---|---|---|---|---|---|---|
| 1-dodecanol | $SbCl_5$ | 2.34 | 1.01 | 13 | 79 | 8 | Colorless. |
| Mixture of 1-dodecanol and 1-tetradecanol | $SbCl_5$ | 1.25 | 1.08 | 8 | 81 | 11 | Do. |
| Mixture of 1-hexadecanol and 1-octadecanol | $SbCl_5$ | 2.74 | 1.09 | 9 | 82 | 9 | Do. |
| 1-decanol | $SbCl_5$ | 2.34 | 1.16 | 5 | 81 | 14 | Do. |
| 1-dodecanol | $BF_3 \cdot OEt_2$ | 2.24 | 1.01 | 18 | 68 | 14 | Light yellow. |
| Mixture of 1-hexadecanol and 1-octadecanol | $BF_3 \cdot OEt_2$ | 2.44 | 1.09 | 13 | 74 | 13 | Do. |
| Mixture of 1-dodecanol and 1-tetradecanol | $BF_3 \cdot OEt_2$ | 1.25 | 1.08 | 11 | 74 | 15 | Do. |
| Commercial epoxy [2] stabilizer | | | | | | | Yellow. |
| Control (no epoxy) | | | | | | | Dark yellow. |

[1] Mole ratio of epichlorohydrin to alcohol.
[2] Octyl epoxy stearate.

have been hereinbefore set forth and provide illustrations of reaction conditions and parameters, and material proportions which can be employed in carrying out the invention, it is to be understood that variations and modifications from the described conditions and illustrative materials can be employed without departure from the basic principles which underlie the invention. All such innovations and modifications which continue to rely on these basic principles are therefore deemed to be circumscribed by the spirit and scope of the invention except as the same may be necessarily limited by the appended claims or reasonable equivalents thereof.

I claim:

1. A solid resinous composition comprising poly(vinyl chloride) and from about 1 to about 10 parts per 100 parts of the poly(vinyl chloride), by weight, of a thermal stabilizing glycidyl ether of the formula:

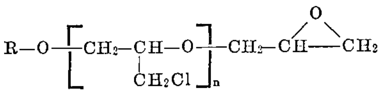

wherein R is alkyl containing from 8 to 18 carbon atoms, and $n$ is an integer from 0 to 5, said glycidyl ether having a molecular weight exceeding about 180 and being compatible with poly(vinyl chloride).

2. The composition of claim 1 in which $n$ is 0.

3. The composition of claim 1 in which R is alkyl containing from 10 to 14 carbon atoms.

4. The composition of claim 1 in which said resinous composition contains from about 2 to about 5 parts of glycidyl ether per 100 parts of poly(vinyl chloride).

5. A solid resinous composition comprising poly(vinyl chloride) and a thermal stabilizer therefor consisting essentially of not more than 10% by weight of normal, primary alkanols containing from about 8 to about 18 carbon atoms, and in addition to said alkanols, a glycidyl ether of the formula:

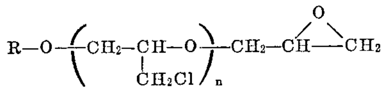

wherein R is an alkyl group derived from said alkanols, and $n$ is an integer from 0 to 5, inclusive, said glycidyl ether having a molecular weight exceeding about 180 and being compatible with poly(vinyl chloride).

6. The composition of claim 5 wherein $n$ is 0.

7. The composition of claim 5 wherein said thermal stabilizer contains less than 5 weight percent of said primary alkanol.

8. The composition of claim 5 wherein said resinous composition contains from 2 to 5 parts of said stabilizing composition per 100 parts of vinylchloride.

9. The composition of claim 5 wherein said alkanols contain from about 10 to about 14 carbon atoms.

References Cited

UNITED STATES PATENTS

| | | | |
|---|---|---|---|
| 2,456,216 | 12/1948 | Richter | 260—45.8 XR |
| 2,462,422 | 2/1949 | Plambeck | 260—45.8 XR |
| 2,559,333 | 7/1951 | Abell | 260—45.8 |
| 2,590,059 | 3/1952 | Winkler | 260—45.8 XR |
| 3,206,482 | 9/1965 | Bright | 260—45.8 XR |
| 3,285,868 | 11/1966 | Hecker et al. | 260—45.8 XR |
| 3,380,948 | 4/1968 | Ericson et al. | 260—45.8 XR |

OTHER REFERENCES

Chevassus et al., The Stabilization of Polyvinyl Chloride, St. Martin's Press, Inc., 1963, pp. 149 and 150.

DONALD E. CZAJA, Primary Examiner

M. J. WELSH, Assistant Examiner

U.S. Cl. X.R.

260—23, 31.8, 348.6